US012624892B2

(12) United States Patent
Azzopardi et al.

(10) Patent No.: US 12,624,892 B2
(45) Date of Patent: May 12, 2026

(54) FILAMENT DRYING SYSTEM

(71) Applicant: Thought3D Limited, Swieqi (MT)

(72) Inventors: Keith Azzopardi, Birkirkara (MT); Edward Borg, Hal Ghaxaq (MT)

(73) Assignee: Thought3D Limited, Swieqi (MT)

( * ) Notice: Subject to any disclaimer, the term of this patent is extended or adjusted under 35 U.S.C. 154(b) by 934 days.

(21) Appl. No.: 17/788,290

(22) PCT Filed: Jan. 12, 2021

(86) PCT No.: PCT/EP2021/050483
§ 371 (c)(1),
(2) Date: Jun. 22, 2022

(87) PCT Pub. No.: WO2021/144265
PCT Pub. Date: Jul. 22, 2021

(65) Prior Publication Data

US 2023/0026709 A1 Jan. 26, 2023

(30) Foreign Application Priority Data

Jan. 16, 2020 (EP) .................................... 20152241

(51) Int. Cl.
*F26B 13/00* (2006.01)
*F26B 3/04* (2006.01)
*F26B 21/04* (2006.01)
*F26B 21/08* (2006.01)
*F26B 21/10* (2006.01)

(52) U.S. Cl.
CPC .............. *F26B 13/001* (2013.01); *F26B 3/04* (2013.01); *F26B 21/04* (2013.01); *F26B 21/083* (2013.01); *F26B 21/10* (2013.01)

(58) Field of Classification Search
CPC .......... F26B 13/001; F26B 3/04; F26B 21/04; F26B 21/083; F26B 21/10; F26B 13/10; F26B 21/02; F26B 23/002; F26B 23/10
See application file for complete search history.

(56) References Cited

U.S. PATENT DOCUMENTS 4,738,896 A * 4/1988 Stevens .................. C04B 41/89
428/317.1
5,121,329 A 6/1992 Crump
(Continued)

FOREIGN PATENT DOCUMENTS

CN 202485356 U 10/2012
CN 107990675 A 5/2018
(Continued)

OTHER PUBLICATIONS

"3D Printer Filament Storage: Is Humidity a Silent Killer for 3D Printed Parts," PAC, Production Automation Corporation, Mar. 1, 2018, available online at https://blog.gotopac.com/2018/03/01/how-3d-printer-filament-storage-cabinets-instantly-improve-3d-print-part-quality/#3D_Printer_Filament_Storage_Is_Humidity_A_Silent_Killer_for_3D_Printed_Parts (13 pages).
(Continued)

*Primary Examiner* — Jessica Yuen
(74) *Attorney, Agent, or Firm* — Alliance IP, LLC

(57) ABSTRACT

A system (27) arranged to dry a filament (5) used in additive manufacture, the system (27) comprising: a first heater (55) arranged to heat air; a tubing section (29) having a wall (31) defining an enclosed passage (33), the passage (33) arranged to convey a filament (5), the tubing section (29) having an air inlet (51) for providing heated air from the first heater (55) into the passage (33); and a second heater (59) arranged around along at least part of the tubing section (29), in order to further heat filament (5) within the passage (33).

22 Claims, 4 Drawing Sheets

(56) References Cited

U.S. PATENT DOCUMENTS

| | | | | |
|---|---|---|---|---|
| 5,503,785 | A | 4/1996 | Crump et al. | |
| 6,923,634 | B2 | 8/2005 | Swanson et al. | |
| 7,122,246 | B2 | 10/2006 | Comb et al. | |
| 9,165,690 | B2 * | 10/2015 | Singh | F26B 5/04 |
| 2001/0030383 | A1 | 10/2001 | Swanson et al. | |
| 2013/0161432 | A1 | 6/2013 | Mannella et al. | |
| 2017/0157855 | A1 | 6/2017 | Larson et al. | |
| 2019/0330766 | A1 | 10/2019 | Steibel, Jr. et al. | |

FOREIGN PATENT DOCUMENTS

| | | | |
|---|---|---|---|
| CN | 109203448 | A | 1/2019 |
| JP | S5083855 | A | 7/1975 |
| JP | 5508355 | B2 | 5/2014 |

OTHER PUBLICATIONS

EPO Extended European Search Report and Written Opinion in EP Application Serial No. 20152241.4 mailed on Jun. 8, 2020 (7 pages).

PCT International Search Report and Written Opinion in PCT International Application Serial No. PCT/EP2021/050483 mailed on Mar. 24, 2021 (11 pages).

Simon, By, "FilaDry filament drying process keeps 3D printer filaments free from moisture," WWW.3ders.org, 3D printer and 3D printing news, Mar. 31, 2015, Available online at https://www.3ders.org/articles/20150331-filadry-filament-drying-process-keeps-filaments-free-from-moisture.html (11 pages).

* cited by examiner

FILAMENT DRYING SYSTEM

CROSS-REFERENCE TO RELATED APPLICATIONS

This Application is a national stage application under 35 U.S.C. § 371 of PCT International Application Serial No. PCT/EP2021/050483, filed on Jan. 12, 2021 and entitled FILAMENT DRYING SYSTEM, which application claims priority to EP application Ser. No. 20/152,241.4 filed on Jan. 16, 2020. The disclosures of the prior applications are considered part of and are hereby incorporated by reference in their entirety in the disclosure of this application.

The present invention relates to a system for drying a filament used in additive manufacture and to an additive manufacturing machine comprising the filament drying system.

Extrusion based additive manufacturing (AM) processes, also known as extrusion 3D printing, are widely known. Typically, raw material is provided as a plastic filament wound on a spool or reel. During a manufacturing process (printing), the filament is unwound and fed to a deposition head. The deposition head includes a liquefier, which heats the material to a temperature at which it can flow. The heated material is then extruded through a nozzle in the desired pattern defined by a CAD model, often in a number of separate layers. The material fuses and re-solidifies as it cools, forming an object.

Commonly used filaments are made from water sensitive (hygroscopic) materials, such as Acrylonitrile Butadiene Styrene (ABS), Nylon/Polyamides (PA), or Polycarbonate thermoplastic. When a filament that has absorbed water is extruded, the water within the material or on the surface of the material vaporizes and creates bubbles and voids in the filament, weakening adhesion between layers in the finished object and making the finished object more susceptible to warping. Water evaporating from the filament can also leave an undesirable surface finish. This is a result of bubbling, opaqueness or changes in the colour of the material, and also due to extra material continuing to ooze out of the extruder when it is not supposed to, resulting in stringing (pieces of extra material attached to the outside surface of the printed part). Additionally, the heated moisture/water can lead to chemical degradation of the materials since it can break apart polymer chains, weakening the material.

Prolonged exposure to even moderately humid environment can cause saturation of a filament. Some filament materials may experience an increase in weight of 10% or more before reaching saturation point. AM machines (3D printers) rely on tight tolerances and extremely small layer heights and unexpected changes in the size of the filament can negatively impact the process. The presence of excess water in the filament can also change the viscosity of the material as it is extruded, so it does not flow as expected. If the filament has very high water content, it can lead to catastrophic failure of the process, causing the process to need to be repeated.

Conversely, removing too much water also adversely affects printing process, and changes the properties of the filament. Therefore, the filament requires conditioning to have a moisture content within a desirable range.

A number of methods are known for trying to prevent a hygroscopic filament absorbing water. One technique is to keep the filament in a humidity controlled environment; either a drybox or dry cabinet. However, this often fails to prevent absorption of water as the filament is exposed to the uncontrolled environment when it is loaded into/unloaded from the machine.

Another technique is to dry the whole filament reel before use. This may be by heating, leaving the reel in the presence of a desiccant or in a vacuum or other methods. This requires good environmental control and long periods of time (between 4 and 24 hours), which are different for different kinds of material types. Furthermore, if reels are regularly swapped, the repeated cycles of drying and absorbing water, can degrade the material of the filament. Over-drying (removal of too much moisture) can also occur, degrading the material and/or printing.

According to a first aspect of the invention there is provided a system arranged to dry a filament used in additive manufacture, the system comprising: a first heater arranged to heat air; a tubing section having a wall defining an enclosed passage, the passage arranged to convey a filament, the tubing section having an air inlet for providing heated air from the first heater into the passage; and a second heater arranged along at least part of the tubing section, in order to further heat filament within the passage.

The drying system conditions the filament to have a moisture content within acceptable limits, by drying the filament to remove some of, but not necessarily all, the moisture.

In a printer using the system, filament is fed through the passage containing heated air prior to extrusion. This means that only the portion of the filament that is about to be fed to the liquefier is heated. Therefore, the portion of filament that needs to be heated at any given time is small, resulting in quicker and more effective drying/conditioning.

In a production environment, the system may be used to dry filament prior to packaging, to reduce the moisture content in the filament. The process is continuous resulting in quicker and more effective drying/conditioning In both cases, extra heating/cooling cycles that could negatively affect the filament are not required. Furthermore, by pre-heating air before it is provided to the passage, and also applying heat directly to the passage, the drying time required in the passage is reduced, and water can be driven out from within the body (bulk material) of the filament as well as from the surface of the filament, whilst maintaining the air temperature below a level that would cause melting of the filament and keeping a relatively short drying time.

In at least some cases, the first heater may heat the air, whilst the second air simply maintains the air at the desired temperature. In other cases, the second heater may provide additional heart.

The system may be provided as a modular device to retrofit to existing 3D printers or production lines, or may be provided as an integral component of a 3D printer or production line.

The tubing section further may have an air outlet for drawing air from the passage. The system may further comprise recycling means for providing air withdrawn at the air outlet to the first heater in a closed loop.

The use of a closed loop and recycling system ensures that the only water in the air is extracted from the filament. If the system were open, air being introduced from the outside environment would need to be dried increasing the work that needs to be done by the system.

The recycling means may include means for extracting water from the air withdrawn at the air outlet before providing it to the first heater. Extracting the water from the air ensures dry air is provided back to the passage, ensuring high efficiency on the drying/conditioning.

The recycling means may comprise a desiccant arranged to extract water from the air as it passed from the air outlet to the first heater. Using a closed loop with a desiccant reduces the need to have to regenerate the desiccant too often, since the only water in the system is the water extracted from the filament.

The system may comprise means for monitoring the saturation of the desiccant. Using a means for monitoring the saturation of the desiccant ensures the efficiency of the system can be maintained, as the desiccant is replaced when no longer effective.

The means for monitoring the saturation of the desiccant may comprise: a first humidity sensor arranged between the air outlet and the desiccant; a second humidity sensor arranged between the desiccant and the first heater; and a recycling control module. The recycling control module may be arranged to: monitor a first humidity measured by the first humidity sensor, and a second humidity measured by the second humidity sensor; and provide a warning when a difference between the first humidity and the second humidity is below a threshold, indicating saturation of the desiccant.

The desiccant may be provided in a replaceable cartridge. This allows for easy replacement of the desiccant when saturated.

The system may comprise cooling means arranged to cool air drawn from the passage, prior to providing the air to the desiccant. This ensures that the air is at a suitable temperature for efficient operation of the desiccant. If the temperature is above a given threshold the desiccant will start releasing water rather than absorbing it leading to reduced efficiency in drying/conditioning or even absorption of water by the filament. The threshold temperature varies for different desiccants but is typically below 50° C. Typically, the lower the air temperature the more efficient a desiccant generally is, but this is not always the case.

The system may comprise a conduit for carrying air from the air outlet to the desiccant. The cooling means may comprise an uninsulated portion of the conduit extending at least part of the length of the conduit.

The conduit may be formed of silicone rubber. The system may comprise a conduit for carrying air from the first heater to the passage. The conduit for carrying air from the first heater to the passage may be insulated.

The closed loop from the air outlet to the air inlet, including the recycling means and first heater, may be formed in a sealed environment. This prevents further water being drawn into the system.

The tubing section may comprise: a filament inlet for receiving filament to be dried; and a filament outlet for providing dried filament. The filament inlet and filament outlet may be sealable around a filament such that the passage forms a sealed space. This prevents further water being drawn into the system.

The filament inlet and/or the filament outlet may comprise: an opening into the passage; and a resiliently deformable sealing member closing the opening, the sealing member having an aperture to receive the filament, the edge of the aperture arranged to engage the filament to form a seal.

The sealing member may comprise an O-ring or resiliently deformable diaphragm.

The sealing member may have a thinned region around the edge of the aperture. This means that the seal can be created without putting too much force or resistance on the filament.

The system may be for use with filament having a diameter greater than a first size. The aperture may have a diameter, the diameter of the aperture being less than the first size. This may ensure a good seal is formed between the diaphragm and the filament.

The diaphragm may comprise silicone rubber.

Along a length of the passage in a direction from the filament inlet to the filament outlet, the air inlet may be provided before the air outlet.

The system may include connection means for connecting the system into a filament path of a printer or filament production line. The system may include means for connecting the filament inlet to the filament store or a filament guide from the filament store; and means for connecting the filament outlet to a deposition head or a filament guide to a deposition head.

The system may further comprise a drying control module arranged to control the first heater and second heater to control the amount of water removed from the filament. This ensures the desired conditioning of the filament is obtained.

The system may further comprise a first temperature sensor arranged to measure an air temperature at an output of the first heater; and a second temperature sensor arrange to measure an air temperature within the passage. The drying control module may control the first heater and the second heater based on the air temperatures measured by the first and second temperature sensors, to control the amount of water removed from the filament.

The system may further comprise humidity sensors arranged to measure humidity of air in the passage. The drying control module may control the first heater and the second heater based on the humidity in the passage, to control the amount of water removed from the filament.

The drying control module may be further arranged to control the speed filament is conveyed through the passage and/or the flow rate of air through the passage, to control the amount of water removed from the filament.

The system may comprise lookup tables comprising a plurality of predetermined temperature or humidity ranges, each associated with a different material. The drying control module may be arranged to: receive an input indicative of a material composition of a filament being used; select an associated predetermined temperature or humidity range; and control the first heater and second heater to maintain air in the passage within the selected predetermined temperature or humidity range.

The system, with a closed loop, may comprise a third temperature sensor arranged to measure an air temperature of air withdrawn from the passage. The drying control module may be arranged to: control the first heater and second heater, based on the air temperatures measured by the first, second and third temperature sensors, to maintain air in the passage within a predetermined temperature range.

Monitoring the temperature of the air withdrawn from the passage ensures the temperature of the air entering the desiccant chamber is also below the threshold temperature for effective operation of the desiccant.

The second heater may be arranged to heat filament within the passage along a portion of the length of the passage.

The second heater may have a plurality of different heating zones arranged along the length of the passage. The second heater may be arranged such that the different heating zones are independently controllable. This ensures that the heating time and total heat applied to the filament can be varied for different materials.

The system may comprise a heating zone control module arranged to control the separate heating zones.

The length of the portion of the passage heated by the second heater may be around 50 cm to 200 cm. In some examples, the length of the portion of the passage heated by the second heater may be approximately 70 cm.

The system may comprise a pump to circulate air through at least the first heater and the passage. This ensures the filament is always maintained in sufficiently dry air to allow transfer of water from the filament to the air.

The system may comprise a pump control module configured to control a flow rate of air through the system.

Two or more of the recycling control module, the drying control module, the heating zone control module, and pump control module may be provided by modules in the same controller such as a system controller.

The first heater may comprise a heating element provided within an air flow in a conduit coupled to the air inlet.

The first heater may comprise one or more fin heating plates.

The second heater may comprise a tape or trace heater having one or more heating element wrapped around an outside of the wall of the tubing section.

The passage may be arranged to convey the filament from a filament store to a deposition head during a printing operation. Alternatively, the passage is arranged to convey the filament within a filament production line.

According to a second aspect of the invention, there is provided a system arranged to dry a filament used in additive manufacturing, the system comprising: a first heater arranged to heat air; a tubing section having a wall defining an enclosed passage, the passage arranged to convey a filament, the tubing section having: an air inlet for providing heated air from the first heater to the passage; and an air outlet for withdrawing air from the passage; and a recycling system arranged to recycle air from the air outlet to the first heater, the recycling system including means for extracting water from the air withdrawn at the air outlet.

The drying system conditions the filament to have moisture content within acceptable limits, by drying the filament to remove some of, but not necessarily all, the moisture in the filament. The use of a closed loop and recycling system ensures that the only water in the air is extracted from the filament. If the system were open, air being introduced from the outside environment would need to be dried increasing the work that needs to be done by the system.

In a printer using the system, filament is fed through the passage containing heated air prior to extrusion. This means that only the portion of the filament that is about to be fed to the liquefier is heated. Therefore, the portion of filament that needs to be heated at any given time is small, resulting in quicker and more effective drying/conditioning.

In a production environment, the system may be used to dry filament prior to packaging, to reduce the moisture content in the filament. The process is continuous resulting in quicker and more effective drying/conditioning In both cases, extra heating/cooling cycles that could negatively affect the filament are not required. Furthermore, by pre-heating air before it is provided to the passage, and also applying heat directly to the passage, the drying time required in the passage is reduced, and water can be driven out from within the body (bulk material) of the filament as well as from the surface of the filament, whilst maintaining the air temperature below a level that would cause melting of the filament and keeping a relatively short drying time.

The system of the second aspect may have a second heater arranged along at least part of the tubing section, in order to further heat filament within the passage.

The passage may be arranged to convey the filament from a filament store to a deposition head during a printing operation. Alternatively, the passage may be arranged to convey the filament within a filament production line.

The system may be provided as a modular device to retrofit to existing 3D printers or production lines, or may be provided as an integral component of a 3D printer or production line.

According to a third aspect of the invention, there is provided an additive manufacturing machine comprising: a filament store; a deposition head including a liquefier for liquefying filament; a filament guide for feeding filament from the filament store to the liquefier; and a system for drying the filament according to the first or second aspect, wherein the tubing section of the system for drying the filament forms at least part of the filament guide.

The tubing section of the system may be immediately upstream of the liquefier.

The additive manufacturing machine may have a plurality of filament stores, each with an associated feed path wherein at least two of the feed paths have separate systems for drying the filament, the systems according to the first or second aspect. Each system for drying the filament may have a separate passage. At least some of the other components of the system may be shared between the two systems.

The system may be controlled to feed filament at a speed such that a time for filament to pass through a heated portion of the passage may be 5 minutes or more. In one example, the time for filament to pass through a heated portion of the passage may preferably be 20 minutes or more. In a further example, time for filament to pass through a heated portion of the passage may preferably be 20 minutes or more. Optionally, the time for filament to pass through a heated portion of the passage may be less than 60 minutes. In one example, the time for filament to pass through a heated portion of the passage may be between 20 and 30 minutes.

Drying/conditioning only the portion of the filament that is about to be fed to the deposition head allows the printable material to be dried in the typical the set-up time for 3D printers, and so the drying system can be incorporated without causing a delay in the printing process.

The system for drying the filament may be releaseably coupled into the feed path.

According to a further aspect of the invention there is provided a system for drying a filament used in additive manufacture, the system comprising: a first heater arranged to heat air; a tubing section having a wall defining an enclosed passage, the passage arranged to feed a filament from a filament store to a deposition head during a printing operation, the tubing section having an air inlet for providing heated air from the first heater into the passage; and a second heater arranged along at least part of the tubing section, in order to further heat filament within the passage.

According to yet a further aspect of the invention, there is provided a system for drying a filament as it is fed to an additive manufacturing machine, the system comprising: a first heater arranged to heat air; a tubing section having a wall defining an enclosed passage, the passage arranged to feed a filament from a filament store to a deposition head during a printing operation, the tubing section having: an air inlet for providing heated air from the first heater to the passage; and an air outlet for withdrawing air from the passage; and a recycling system arranged to recycle air from the air outlet to the first heater, the recycling system including means for extracting water from the air withdrawn at the air outlet.

It will be appreciated that features disclosed in relation to one aspect of the invention may be applied to any other aspect, unless mutually exclusive.

Embodiments of the invention will now be described, by way of example only, with reference to the accompanying drawings in which:

FIG. 1 schematically illustrates a 3D printer incorporating a filament drying system according to an embodiment of the invention;

FIG. 2 schematically illustrates the filament drying system of the 3D printer of FIG. 1;

FIG. 3 schematically illustrates one of the filament seals from the filament drying system of FIG. 2;

Figure 1:
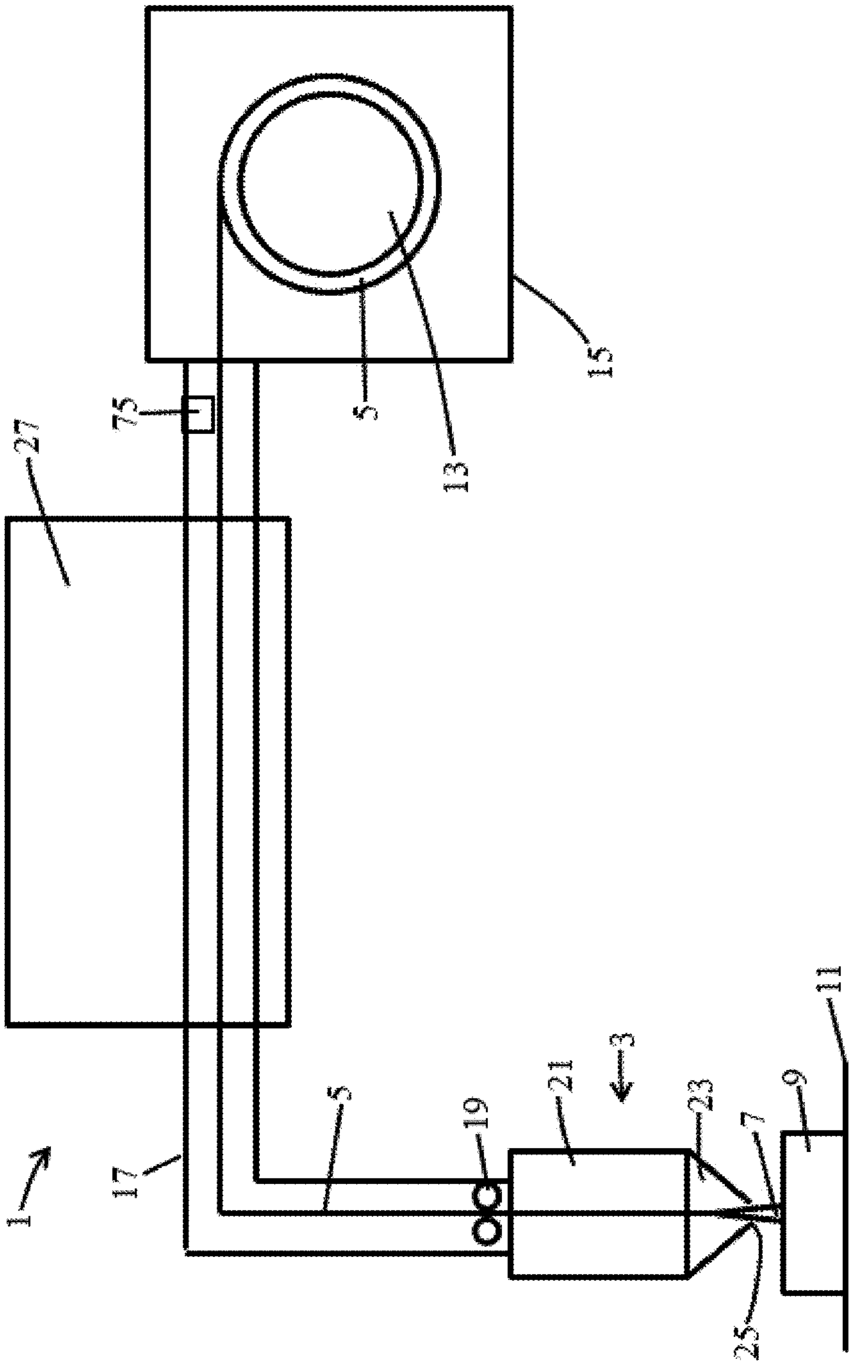

FIG. 1 schematically illustrates a 3D printer 1 or AM machine. It will be appreciated that the details of the 3D printer 1 are given by way of example only, in order to explain various embodiments of the invention. It will be appreciated that in the context of this description, the terms 3D printing and additive manufacturing are used interchangeably.

The 3D printer 1 uses an extrusion head 3 to liquefy a filament 5 and deposit the liquefied material 7 onto a workpiece 9 mounted on a substrate or platform 11. In the example shown, the filament 5 is supplied wound on a reel or spool 13. The filament may be packaged in a sealed container (not shown) from which it needs to be removed before use. It will be appreciated that the use of a reel or spool 13 and a sealed container is by way of example only, and the filament 5 may be provided in any suitable manner.

In use, the filament 5 is provided within a filament store 15. A guide tube 17 made of low friction material connects the filament store 15 to the extrusion head 3 and conveys the filament 5 in the printer 1. In the example shown, the guide tube 17 is an enclosed space through which the filament 5 passes, and the guide tube 17, filament store 15 and extrusion head 17 may be held in a sealed or controlled environment, but this need not necessarily be the case. Any suitable low friction material, such as Polytetrafluoroethylene (PTFE) may be used for the guide tube 17. Other suitable materials, such as silicone rubber/silicone may also be used for the guide tube 17 in other examples.

The filament 5 is fed through the guide tube 17, unwinding filament from the spool 13 until the filament 5 reaches the extrusion head 3. A pair of motor-driven advancing rollers 19 are provided at the extrusion head 3. The filament is manually fed through the guide tube 17 until it reaches the rollers 19, and then the action of the rollers continues to draw filament 4 through the guide tube 17. In some example the rollers 19 may be upstream of the extrusion head 3, or a second pair of advancing rollers 19 may be provided.

In use, during a printing operation, the filament 5 is advanced by the advancing rollers 19 into a liquefier 21 carried by the extrusion head 3. Inside the liquefier 21, the filament 5 is heated to a flowable temperature. As the advancing rollers 19 continue to advance the filament 5 into the extrusion head 3, the force of the incoming filament 5 extrudes the flowable material out from an orifice 25 in a dispensing nozzle 23 downstream of the liquefier 21 (in the direction of filament movement) where it is deposited onto the workpiece 9, or substrate/platform 11.

The flow rate of the material 7 extruded from the nozzle 23 is a function of the rate at which the filament 5 is advanced to the extrusion head 3 and the size of the dispensing nozzle orifice 25.

A controller 100 (discussed in relation to FIG. 4) controls movement of the extrusion head 3 in a horizontal x, y plane, controls movement of the platform 11 in a vertical z-direction, and controls the rate at which the advancing rollers 19 advance filament into the head 3, to control the printing process.

The guide tube 17 incorporates a system 27 for conditioning the filament 5. Conditioning the filament involves drying the filament 5 to ensure the moisture content is within a desired range.

Figure 2:
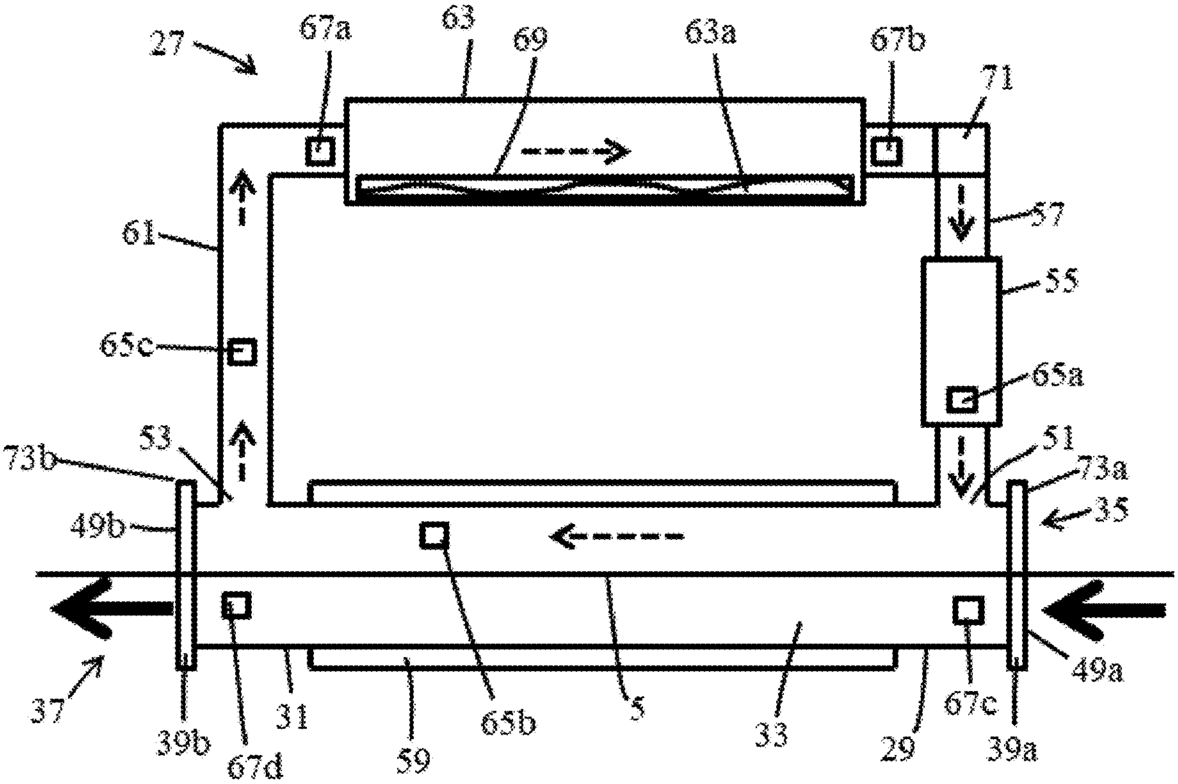

The filament drying system 27 is shown in FIG. 2 in more detail. The bold arrows show the direction of movement of the filament 5 in the system 27. It will be appreciated that, depending on the particular application, the drying system 27 may remove some or all of the moisture in the filament 5.

The filament drying system 27 includes a tube section 29 formed by an outer wall 31 forming a passage 33 through which the filament 5 passes. In some examples, the tube section 29 is made of similar material to the guide tube 17 discussed above (for example PTFE or silicone). The material of the tube section 29 may optionally be modified to improve heat transfer. For example conducting additives, such as carbon black, may be incorporated into the material of the tube section 29. In other examples, the tube section 29 may optionally be metal or another material arranged to provide high thermal conductivity.

At a first (upstream) end an opening 49*a* into the passage 33 forms a filament inlet 35. Likewise, at an opposite second (downstream) end an opening 49*b* into the passage 33 forms a filament outlet 37. In use, during a printing operation, the filament 5 is fed from the filament store 15, through the filament inlet 35, along the length of the passage 33, and through the filament outlet 37 where it is subsequently fed to the extrusion head 3.

Figure 3:
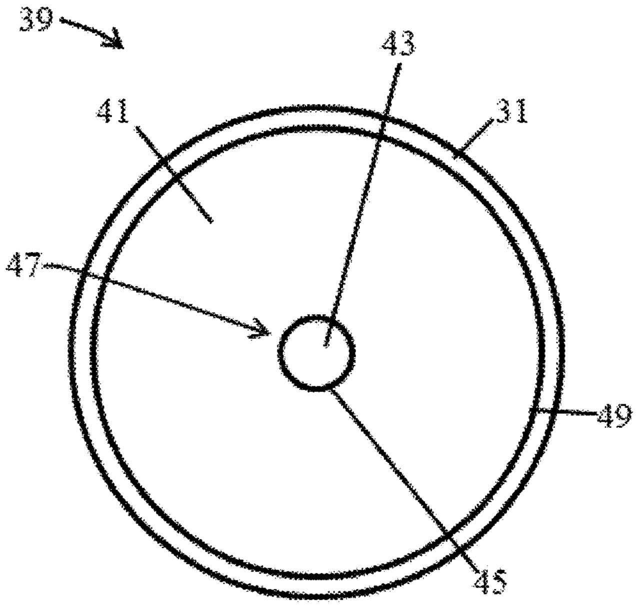

The filament inlet 35 and filament outlet 37 are both closed by filament seals or valves 39*a,b* to ensure the space inside the passage 33 is sealed, and no air can escape the filament inlet 35 or filament outlet 37. FIG. 3 illustrates a filament seal 39 in more detail.

In the example shown, the filament seal 39 comprises a diaphragm 41 that extends across an opening 49 in the end of the passage 33. An opening 43 is formed in the diaphragm 41, through which the filament 5 can pass. The diaphragm 41 is made of a resiliently deformable and soft material, such as silicone rubber, and the opening 43 is slightly narrower than the diameter of the filament 5 it is used with. Therefore, the inner edge 45 of the diaphragm 41, which defines the opening 43, forms a seal with the filament 5, whilst still allowing the filament 5 to move through it, when drawn by the advancing rollers 19. By forming the seal onto the filament 5, air is prevented from escaping from or into the passage 33 through the filament inlet 35 or filament outlet 37.

In one embodiment, the material of the diaphragm 41 may be thinned in the region 47 around the opening 43, to ensure the correct force is applied to form the seal but allow the filament 5 to be drawn through. It will be appreciated that this is optional, and the diaphragm 41 may have any suitable structure.

The passage 33 of the filament drying system 27 is supplied with air at an air inlet 51, which is provided at or near the end 49*a* of the passage 33 forming the filament inlet 35. At or near the opposite end 49*b* of the passage 33, forming the filament outlet 37, an air outlet 53 is provided for drawing air from the passage 33.

Prior to entering the passage 33, the air is heated by a first heater 55. In the example shown, the air is fed through an inlet conduit 57 and the first heater 55 is formed by one or more heating elements (not shown) provided within the tubing 55, such that the air flows through or over the heating element(s). For example, fin heating elements (not shown) may be provided. The inlet conduit 57 may be insulated to prevent heat loss, and is made of similar material as the guide tube 17.

Along at least a portion of the length of the passage 33 between the air inlet 51 and the air outlet 53, a second heater 59 is provided. The second heater 59 is in the form of a trace or tape heater which may have one or more heating elements wound around the outside of the tubing section 29.

In use, air, heated by the first heater 55, enters the passage 33. As the air travels along the passage towards the filament outlet 37, the heat from the heated air, and additional heat from the second heater 59 heat the filament 5, causing water to be drawn out of it, drying the outer surface and inside (bulk) of the filament 5. It will be appreciated that in some cases, the function of the second heater 59 is simply to maintain the air at the same temperature as provided by the first heater 55. In other cases, the second heater 59 may provide further heating function.

The air containing water removed from the filament 5 is drawn from the passage 33 at the air outlet 53. The air is provided from the air outlet 53 to a desiccant chamber 63 through an outlet conduit 61. The outlet conduit 61 may be made of any suitable material. For example, the outlet conduit 61 may be silicone rubber, PTFE or another thermally conductive material. At least a portion of the outlet conduit 61 is uninsulated to allow cooling of the air before it reaches the desiccant chamber 63.

Within the desiccant chamber 63, the air is dried by passing it through or over a desiccant 63*a*, and then provided back to the inlet conduit 57. In this way, the inlet conduit 57, outlet conduit 61 and desiccant chamber 63 form a loop that can recycle air withdrawn from the air outlet 53, back to the air inlet 51, whilst drying it. Examples of desiccants that can be used include: Montmorillonite Clay; Silica Gel; Indicating Silica Gel; Molecular Sieve; Calcium Oxide; Calcium Sulfate and other Adsorbents.

In a similar manner to the passage 33, the inlet conduit 57, outlet conduit 61 and desiccant chamber 63 are enclosed spaces. Therefore, the loop formed is a closed loop. The dashed arrows in FIG. 2 show the circulation of air around the closed loop. The closed loop is a sealed system that prevents water entering from the surrounding environment.

A pump 71 is provided to circulate air through the closed loop of the inlet conduit 51, passage 33, outlet conduit 61 and desiccant chamber 63. In the example shown, the pump 71 is provided between the desiccant chamber 63 and inlet conduit 57. However, it will be appreciated that the pump 71 may be provided at any location in the loop, and any number of pumps 65 may be provided.

A number of temperature sensors 65*a,b,c* and humidity sensors 67*a,bc,d* are provided at different positions around the closed loop to monitor the temperature and humidity of the air in the loop.

For example, a first temperature sensor 65*a* may be provided in the inlet conduit 57, in the region of the first heater 55, or between the first heater 55 and the air inlet 51 into the passage 33. This can monitor the temperature of the air being provided to the passage 33.

A second temperature sensor 65*b* may be provided in the passage 33, to monitor the temperature of the air in the passage 33. The second temperature sensor 65*b* may be provided at any point along the portion of the passage 33 heated by the second heater 59.

A third temperature sensor 65*c* may be provided in the outlet conduit 61, to monitor the temperature of air withdrawn from the passage.

Humidity sensors 67*a,b* may be provided in the outlet conduit 61 and inlet conduit 57, on either side of the desiccant chamber 63, to monitor the humidity of air before and after it is passed over the desiccant 63*a*.

Further humidity sensors 67*c,d* may be provided within the passage 33. The further humidity sensors 67*c,d* may be provided at or near the filament inlet 35 and filament outlet 37 to measure the humidity of the air in the passage 33.

As will be discussed below in more detail, monitoring the temperature of air at the first heater 55 and within the passage 33 ensures the air is heated to the correct temperature to remove water from the filament 5, without liquidising it, before the extrusion head 3. For materials typically used in 3D printers, the filament should be heated to between 60° C. to 150° C. (although for some materials, and/or to reduce drying time, the temperature may be up to 200° C.). It will be appreciated that the desirable temperature range will vary depending on the material composition of the filament. In one example, the filament should be heated to within ±10° C. of the glass transition temperature of the material of the filament.

As will also be discussed below in more detail, monitoring the temperature of air withdrawn from the passage 33 ensures the air is sufficiently cooled for effective operation of the desiccant 63*a*. Typically, the air should be cooled to below 50 degrees centigrade for most desiccants.

In addition to the above, measuring the humidity in the passage 33 near the filament inlet 35 and filament outlet 37 provides an estimate of the moisture in the filament 5, which allows for proper control of the conditioning of the filament 5, as will be discussed below.

As will further be discussed in more detail below, monitoring the humidity before and after the desiccant 63*a* monitors the effectiveness of the desiccant 63*a*, and can provide an indication of when the desiccant 63*a* needs replacing. As the saturation of the desiccant increases, the efficiency of the desiccant to remove water from air reduces, so once the desiccant 63*a* reaches a saturation threshold, where it is no longer effective, it requires replacement.

For example, when the difference between the humidity measured by the two sensors 67*a,b* is below a threshold, this may indicate that the desiccant 63*a* is no longer removing water from the air and requires replacement. The desiccant 63*a* may be provided in a replaceable cartridge 69 to allow easy replacement of the desiccant 63*a*.

It will be appreciated that if the air in the outlet conduit 61 is dry (i.e. no moisture is removed from the filament 5), the difference between the humidity at the first and second sensors 67*a,b* may also be below the threshold. Therefore, an additional check of the humidity of the air before the desiccant 63*a*, measured by the first humidity sensor 67*a* may also be used, to ensure the desiccant 63*a* is saturated.

The tubing section 29 may also include connectors 73*a,b* for connecting the tubing sections to upstream and downstream portions of the guide tube 17 however, these may also be omitted, and the tubing section 29 may simply be provided upstream of or downstream of an existing guide tube 17 of a printer 1. Where connectors 83*a,b* are provided, any suitable connection can be used.

Figure 4:
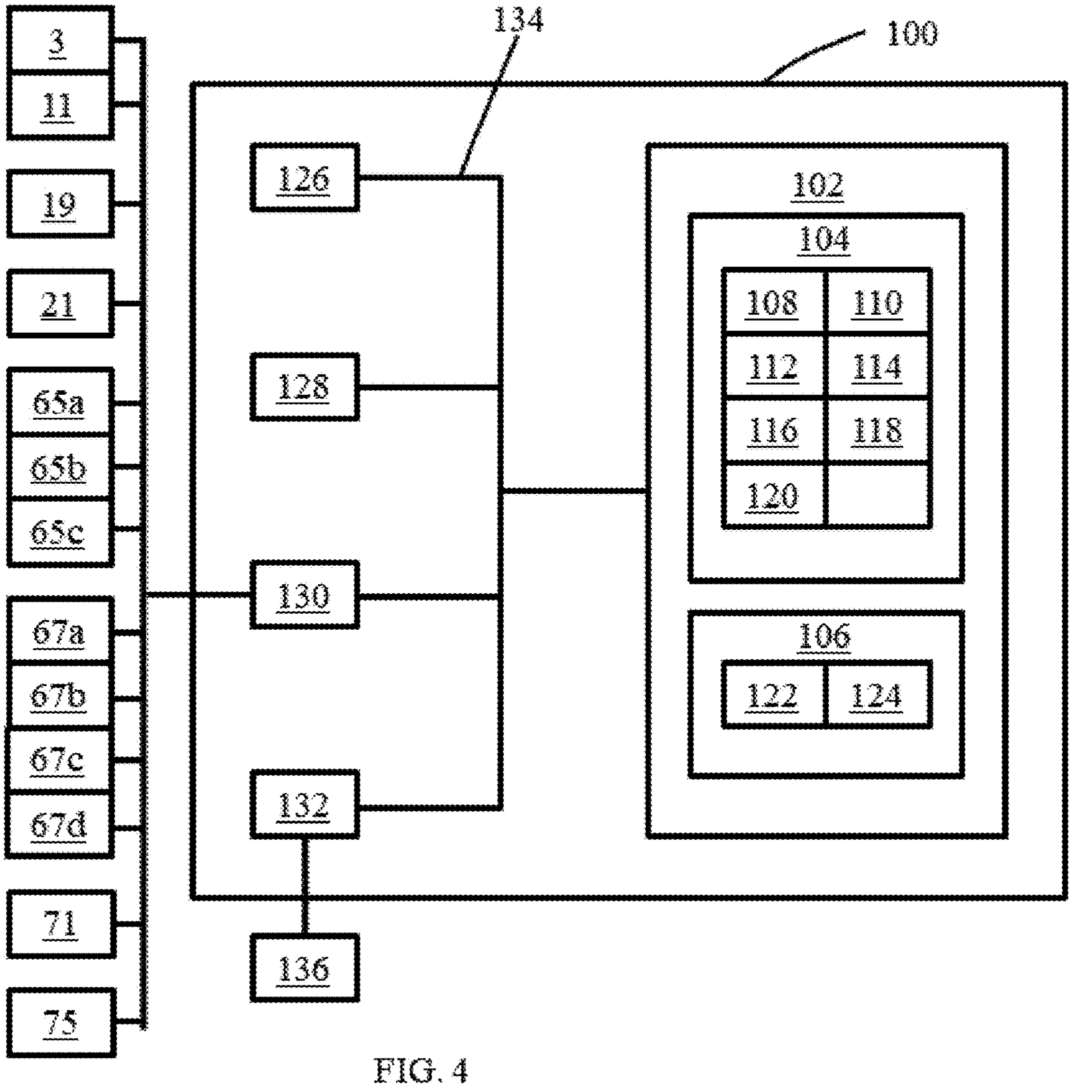
FIG. 4 illustrates an example of a controller for controlling operation of the 3D printer of FIG. 1.

FIG. 4 illustrates a controller 100 for operating the 3D printer 1. The controller 100 includes a processing unit 126 (for example an 8 bit or 32 bit microcontroller, such as an Atmega328P, ESP32 ARM processor, or Intel® X86 processor such as an IS, 17 processor or the like) a memory 102, a communications interface 128, system drivers 130, and a system interface (input/output sub-system) 132, connected to each other via a system bus 134.

The memory 102 is subdivided into program storage 104 and data storage 106. The program storage 104 includes program code modules 108, 110, 112, 114, 116, 118, 120, 122, 124 which, when executed on the processing unit 126 controls the 3D printer 1 through the system drivers 130.

It will be appreciated that although reference is made to a memory 102 it is possible that the memory 102 could be provided by a variety of devices. For example, the memory may be provided by a cache memory, a RAM memory, a local mass storage device such as the hard disk, any of these connected to the processing unit 126 over a network connection. The processing unit 126 can access the memory 102 via the system bus 134 and, if necessary, the communications interface 128, to access program code to instruct it what steps to perform.

The program code may be delivered to memory 102 in any suitable manner. For example, the program code may be installed on the device from a CDROM; a DVD ROM/RAM (including −R/−RW or +R/+RW); a separate hard drive; a memory (including a USB drive; an SD card; a compact flash card or the like); a transmitted signal (including an Internet download, ftp file transfer of the like); a wire; etc.

The controller 100 may be integrated with the 3D printer 1, or may be in a separate location (for example a user's computer or mobile phone or the like), or distributed between two or more of these. Where the controller 100 is not integrated with the 3D printer 1, the controller 100 may communicate with the 3D printer 1 by wired communications or wireless communications.

In order to print an object 9, the 3D printer 1 requires a schematic or design file (CAD file) that instructs the 3D printer 1 where to deposit material. The design files are stored in a schematics module 122 of the data storage portion 106 of the memory 102.

In order to print the object within a particular design file, an X-Y movement module 108 in the program storage portion 104 of the memory 102 controls movement of the extrusion head 3 in the x and y directions, a Z movement module 110 controls movement of the platform in the Z direction, and a roller control module 112 controls the feed of filament 5 to the extrusion head 3 by controlling the speed of the advancing rollers 19. Each of the X-Y movement module 108, Z movement module 110 and roller control module 112 control operation of the respective part of the 3D printer 1 through the system drivers 130.

It will be appreciated that in some examples, the design file includes the specific movement of the extrusion head 3, platform 11, and advancing rollers 19, but in other examples, the movement of these parts may be derived from the design file.

Three separate software modules 114, 116, 118 are provided to control the operation of the filament drying system 27. These software modules 114, 116, 118 may be provided as sub-modules of a single drying system module. Furthermore, the drying system module(s) 114, 116, 118 may be installed on a controller 100 of a 3D printer 1 as discussed above.

A drying control module 114 monitors the temperatures measured at the temperature sensors 65*a-c* in the system 27 and the humidity measured by at least the further humidity sensors 67*c,d* in the passage 33, and controls the heaters 55, 59 to achieve a desired conditioning of the filament 5 by appropriately drying the filament 5.

A pump control module 116 controls operation of the pump 71, to drive circulation of air around the system 27. In some embodiments, the flow rate of air by the system may be a further variable that can be controlled in order to control the drying.

Recycling control module 118 in the program storage 104 is responsible for monitoring the humidity measured by the humidity sensors 67*a,b* and generating a warning, as discussed above, when the desiccant 63*a* requires replacement. It will be appreciated that the warning may be provided through any suitable output device 136 connected to the I/O subsystem 132. This may include a screen, light, speaker or any other device.

The operation of the drying system 27 by the drying control module 114 will now be described in more detail.

Data storage portion 106 of the memory 102 includes lookup-tables 124 having desired temperature ranges and/or moisture content for different materials. The look-up tables may also include calibration data, linking the temperature and humidity measured in the passage 33 to the desired conditioning of the filament 5.

Different calibration data is provided for each different filament (different materials and/or sizes). For example, the calibration data may be obtained by directly measuring the moisture content of a test filament 5 after it passes through the filament outlet 37 over a range of different operating conditions, and associating the directly measured humidity with the humidity measured at the further humidity sensors 67*c,d* in the passage 33 (and optionally the temperature measured at the different temperature sensors 65*a,b,c*).

When obtaining the calibration data, the moisture content of the filament 5 may be measured using a number of known techniques such as thermogravimetric techniques, or Karl Fischer Titration methods.

To identify the correct calibration data/look-up table to be used, the user may input information identifying the material through input devices 136 (such as a keyboard, mouse, touch screen and the like) connected to the I/O system 132 of the controller 100. Alternatively, the material may be identified in the design files, or on a memory or other identifier provided with the material (such as a QR code). The identifier may be transferred to the controller 100 in any suitable manner.

Alternatively, the desired conditioning parameters (and calibration data) may be input directly by the user through input devices 136, provided in the design files, or on a memory provided with the material, as discussed above.

During operation of the drying system 27, measurement of the moisture in the passage 33 at or near the filament inlet 35 and filament outlet 37 and comparison to the calibration tables provides an estimate of the moisture content of the filament 5 by inference. The temperature of the first heater 55 and/or the second heater 59, and/or the speed of air flow through the passage 33 may be varied according to the calibration tables to control the amount of water removed from the filament 5, to achieve the desired conditioning.

Furthermore, as discussed above, the temperature needs to be sufficient to achieve desired conditioning, but not so high that the filament 5 is liquidised before reaching the extrusion head 3, or over-dried. The temperature in the outlet conduit 61 also needs to be sufficiently low to allow efficient operation of the desiccant 63*a*. Therefore, this provides further limits on how the heaters 55. 59 may be operated, providing limits that cannot be exceeded.

Known Proportional Integral Derivative (PID) control techniques, or other suitable techniques, may be used to control the heaters 55, 59 and air flow rate to achieve the desired conditioning.

It will also be appreciated that the conditioning of the filament 5 is dependent on the time the filament 5 is exposed to the heat. Typically, the overall drying time should be at least 5 minutes. In one example, the drying time may be at least 10 minutes, or at least 20 minutes. The drying time should typically be less than 60 minutes. In one particular example, the drying time may be between 20 and 30 minutes, although this is by way of example only. The drying time required for different materials may vary, and the lookup tables 124 may also include drying times (or the drying times may be included in design files or input by a user as discussed above).

Generally, the drying time in the system 27 is set by the length of the second heater 59 along the tubing section 29. Typically, the speed at which filament 5 is fed to the extrusion head is between 0.2 mm/s and 1 mm/s, and so to achieve the desired drying times without modifying the feeding speed of the printer 1, the heated portion of the tubing section may be between 50 cm and 200 cm. In one specific example, the heated section may be 70 cm. However, it will be appreciated that any suitable feeding speed and thus any suitable length of tubing section may be used.

In other examples, the speed of drawing the filament 5 through the passage 33 may be varied in order to control the drying time. Again, the desired speed or time may be input by the user, or included in design files or lookup tables 124, or provided by any other suitable means In some embodiments, a motion sensor 75 may be provided to monitor the movement of the filament 5. The motion sensor 75 may be provided in any suitable position to monitor the direction and/or speed of the filament 5. In the example shown in FIG. 1, the motion sensor 75 is provided within in the guide tube 17 for the filament. However, the motion sensor 75 may be provided in any suitable position outside the passage 33 of the filament drying system 27. For example, the motion sensor 75 may be provided within the extrusion head 3, feed store 15 or at any other suitable position. Alternatively, where the motion sensor 75 is able to withstand the temperatures inside the passage 33, the motion sensor may be provided inside the passage 33. The motion sensor may be connected by suitable wireless or wired connections to prevent air escaping the passage 33.

The measured speed of the filament 5 may also be used as a control parameter. For example if the filament slows down (e.g. due to a partial blockage), the temperature may be reduced since the time taken for the filament 5 to pass through the passage 33 increases. Furthermore, in the event that the print fails, and the extrusion head 3 stops drawing filament 5, the motion sensor 75 will sense the stoppage and stop heating the filament 5. This helps to maintain filament quality, and also reduces likelihood of the system 27 overheating or causing other damage such as fire.

Figure 5:
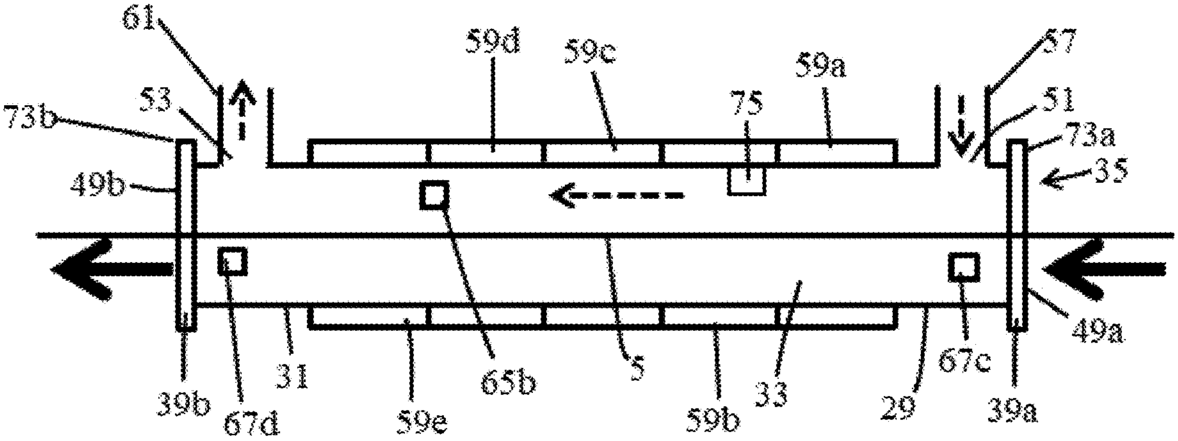
FIG. 5 illustrates the tubing section of a filament drying system according to an alternative embodiment of the invention.

FIG. 5 shows the tubing section 29 of a filament drying system 27 according to a second embodiment of the invention. Unless stated otherwise, this second embodiment is the same as the first, and so like reference numerals are used for like features.

In the second embodiment, a plurality of second heaters 59*a-e* are provided along the length of the passage 33. Each second heater 59*a-e* is arranged to extend along a portion of the length of the tubing section 29, and is independently controllable. The different heaters 59*a-e* may each be a tape or trace heater, and may each have one or more separate heating element.

Where all second heaters 59*a-e* are operated in the same way, the effect of the second embodiment is the same as the first. However, the separate second heaters 59*a-e* may be controlled in a number of different ways, to create different heating zones in the passage 33. For example, the heaters 59*a-e* may be arranged to:

Only heat a portion of the passage 33 in order to provide further control over the drying time. In one example, only the first three heaters 59*a-c* adjacent the filament inlet 35 may be used. In a second example, the last three heaters 59*c-e* adjacent the filament outlet 37 may be used. In other examples, any suitable sub-set of heaters 59*a-e* may be operated.

Create a temperature differential, so the temperature varies along the length of the passage 33 (for example, increasing from the inlet 35 to the outlet 37, decreasing from the inlet 35 to the outlet 37, or following any other patterns).

Create alternating zones of different temperature.

Create any other patterns in the temperatures of the zones.

According to this second embodiment, a further software module, heat zone control module 120, may be provided in program storage 104. This module 120 includes instructions for operating the different second heaters 59*a-e*. In a similar manner to other variable aspects of the operation, instructions for varying the different heating zones may be in the lookup tables 124, in the design files 122, input by a user or provided in any other suitable way as discussed above.

Although FIG. 5 shows the set of second heaters 59*a-e* forming a single continuous heated region, with no spaces between the different second heaters 59*a-e*, other examples, may have spaces between the separate second heaters 59*a-e*, forming spaced heating zones. Furthermore, any number of second heaters may be provided.

In many cases, a 3D printer 1 may have multiple feed stores 15 and/or deposition heads 3. In some cases, the drying system 27 may be able to be disconnected and reconnected as each different store/head is required. This can be manual or automated. In other examples, separate filament drying systems 27 may be provided for each store.

In some cases, the different filament drying systems 27 may be entirely separate. However, in other cases, at least some part of the systems 27 may be combined. For example, whilst each separate system may require a separate tubing section, at least some part of the controller 100 may be common. In other examples, the desiccant and/or some of the air recirculation system may also be shared between the two systems 27.

In other examples, the passage 33 and filament seals 39*a,b* may be arranged to allow multiple filaments to pass through the passage. For example, the diaphragm 41 may be provided with multiple openings 43. In some cases, filament 5 is fed through each opening to ensure the passage 33 remains sealed, but only the filament required is drawn through by the advancing rollers 19. In other examples, the openings 43 may be closable to ensure proper sealing. Different diaphragms 41 may also be provided for different numbers of filaments 5.

In the embodiments discussed above, it will be appreciated that the tubing section 29 may be either a flexible tubing section, or preformed into a particular shape to fit into a desired space. The use of tape or trace heater for the second heater 59 ensures that the passage remains heated no matter what shape it adopts.

The filament drying system 27 may be used with any suitable filament 5. The filament is usually made of a thermoplastic or wax material, and comprises a solidifiable material which adheres to the already deposited material with an adequate bond upon solidification and which can be supplied as a flexible filament.

Filament 5 for 3D printing typically has a circular cross-section with diameter of between 1.75 mm and 2.85, although different sizes and shapes are also contemplated.

It will be appreciated that in some cases, a filament seal 39 as discussed above may be used with a single standard filament size or range of sizes, with different filament seals 39 provided for different size filaments 5.

As discussed above, the system 27 forms a closed loop for recirculating air. Assuming no leaks, the system 27 can remain perpetually in use as long as the desiccant 63*a* remains effective. In practice any losses, such as at joints, or at filament seals 39 will be replaced by air entering the system 27 when the desiccant 63*a* is replaced. However, it will be appreciated that an air inlet from atmosphere into the system 27 may be provided to perform the top up function. Further, pressure and/or flow sensors may be provided to detect when top up is required.

In the examples described above, the system 27 is a standalone system that can be connected to or retrofitted to any existing 3D printer 1. In the example shown, the tubing section 29 of the system 27 is connected into the guide tube 17 of an existing 3D printer 1, midway along the guide tube 17. However, it will be appreciated that the inlet 35 of the tubing section 29 may be connected directly to the filament store 15 and/or the outlet 37 may be connected directly to the deposition head 3 (where the advancing rollers 19 are provided within the extrusion head 3 or within the tubing section 29).

Where the tubing section 29 is not connected to the extrusion head 3, the guide tube 17 downstream of the tubing section may optionally be a sealed environment, to ensure no water re-enters the filament, although this is optional as the time the filament sits between the tubing section 29 and extrusion head 3 is relatively short.

In other examples the filament drying system 27 may be integrally formed with the 3D printer 1. In this case, the tubing section 29 may not require separate connectors 73*a,b* as the tubing section is integrally formed with the guide tube 17. Alternatively, the connectors may still be provided.

In the examples shown, filament seals 39 are used at the filament inlet and outlet 35, 37, and the filament seal 39 comprise diaphragms 41 made of silicone rubber. However, it will be appreciated that any suitable resiliently deformable and soft material may be used, such as EPDM rubber, natural rubbers, MBR, TU and other elastomers. In some examples, the diaphragm 41 may take the form of an O-ring or other sealing member.

It will also be appreciated that any suitable sealing member may be used instead of diaphragms 41. Furthermore, in some cases, where the 3D printer is already sealed from the filament store 15 to the extrusion head 3, the filament seals may be omitted.

Furthermore, in the examples shown, the air inlet and outlet 51, 53 are simple openings. However, these may be controlled by valves (for example electrically controlled solenoid valves) to control the flow of air around the system 27.

The examples shown use circular cross-section tubing for the passage 33 and inlet/outlet conduits 57, 61. However, it will be appreciated that any shape tubing may be used.

In the examples discussed above, the filament drying system 27 include a closed loop in order to recycle air from the air outlet 53 to the air inlet 51. The recycling process involves drying the air and then pre-heating it with the first heater 55.

In the examples discussed above, a desiccant 63*a* is used to extract water/moisture from the air. However, any suitable air dryer may be used.

Furthermore, where a desiccant 63*a* is used, the outlet conduit 61 is arranged to cool the air before it reaches the desiccant. In the example, this is achieved by having at least a portion of the conduit 61 uninsulated, however, any suitable cooling means may be used. The cooling may be achieved by active or passive cooling.

In at least some examples the filament drying system 27 may not be a closed loop. Instead, air may be taken into the system 27, optionally dried, and then pre-heated by a first heater 55 before being provided to the passage 33. Air is then exhausted to the environment from the passage 33.

In the examples discussed above, the first heater 55 is a fin heater, and the second heater 59 is a tape/trace heater wound around the outside of the passage 33. However, it will be appreciated that any suitable type of heater may be used for the first heater 55 and any suitable type of heater may be used for the second heater 59.

In some examples, the second heater 59 may be arranged within the passage 33, out of the path of the filament 5. Alternatively, the second heater 59 may be formed a heating element embedded within the material of the wall 31 forming the passage 33, or by the material of the outer wall 31 itself.

Furthermore, in some examples, the second heater 59 may be omitted, and the pre-heated air only used.

The controller 100 given in FIG. 4 is given by way of example only. Any suitable controller 100 may be used. Furthermore, in some cases, the separate software modules 108, 110, 112, 114, 116, 118, 120 may be provided by two or more separate controllers. For example, the modules 108, 110, 112 which control the printing process (X-Y movement, Z movement and rollers) may be provided in a first controller, and the other modules in a second controller, or each of the modules may be provided by a separate controller.

Any suitable input/output device may be used, and it will be appreciated that in some cases the input/output devices may be remote from the 3D printer 1, connected through the communications interface 128 (for example an app on a computer, mobile telephone and the like).

Any number of temperature sensors 65 and humidity sensors 67 may be provided to monitor temperature and humidity in the system 27. The positioning of the flow and temperature sensors 65, 67 discussed above is given by way of example only.

In general, the first temperature sensor 65*a* may be positioned anywhere along the inlet conduit 57, in particular, anywhere along the portion of the inlet conduit 57 heated by the first heater 55 or between the first heater 44 and the air inlet. The second temperature sensor 65*b* may be provided at any position along the portion of the passage 33 heated by the second heater 59, and the third temperature sensor 65*c* may be positioned anywhere between the air outlet 53 and the desiccant chamber 63. The heater settings may be calibrated based on the measured heating profile of the system.

Similarly, the first humidity sensor 67*a* may be provided anywhere along the outlet conduit 61, and the second humidity sensor may be positioned anywhere along the inlet conduit 57, and may also be suitably calibrated.

The further humidity sensors 67*c*, 67*d* may be provided at any point in the passage 33. Calibration data then allows the measured humidity in the passage 33 to be used to infer a moisture content of the filament 5 at the filament outlet 5. In the case where two (or more) humidity sensors 67*c*, 67*d* are provided in the passage 33, the relative measurement between the two sensors may be used. However, in other examples, a single humidity sensor 67*c* may be provided in the passage 33. In this case, the measurement of the humidity after the desiccant 63*a*, taken by the second humidity sensor 67*b*, may be used, or it may be assumed that the air is completely dried by the desiccant 63*a*.

The examples discussed above have been explained in relation to an extrusion type 3D printer 1. However, it will be appreciated that the system 27 may be used in any 3D printer or AM machine using filament 5 as a build material, and using any type of deposition head 3. Furthermore, the drying system 27 may also be used in a production line for making filament 5.

Figure 6:
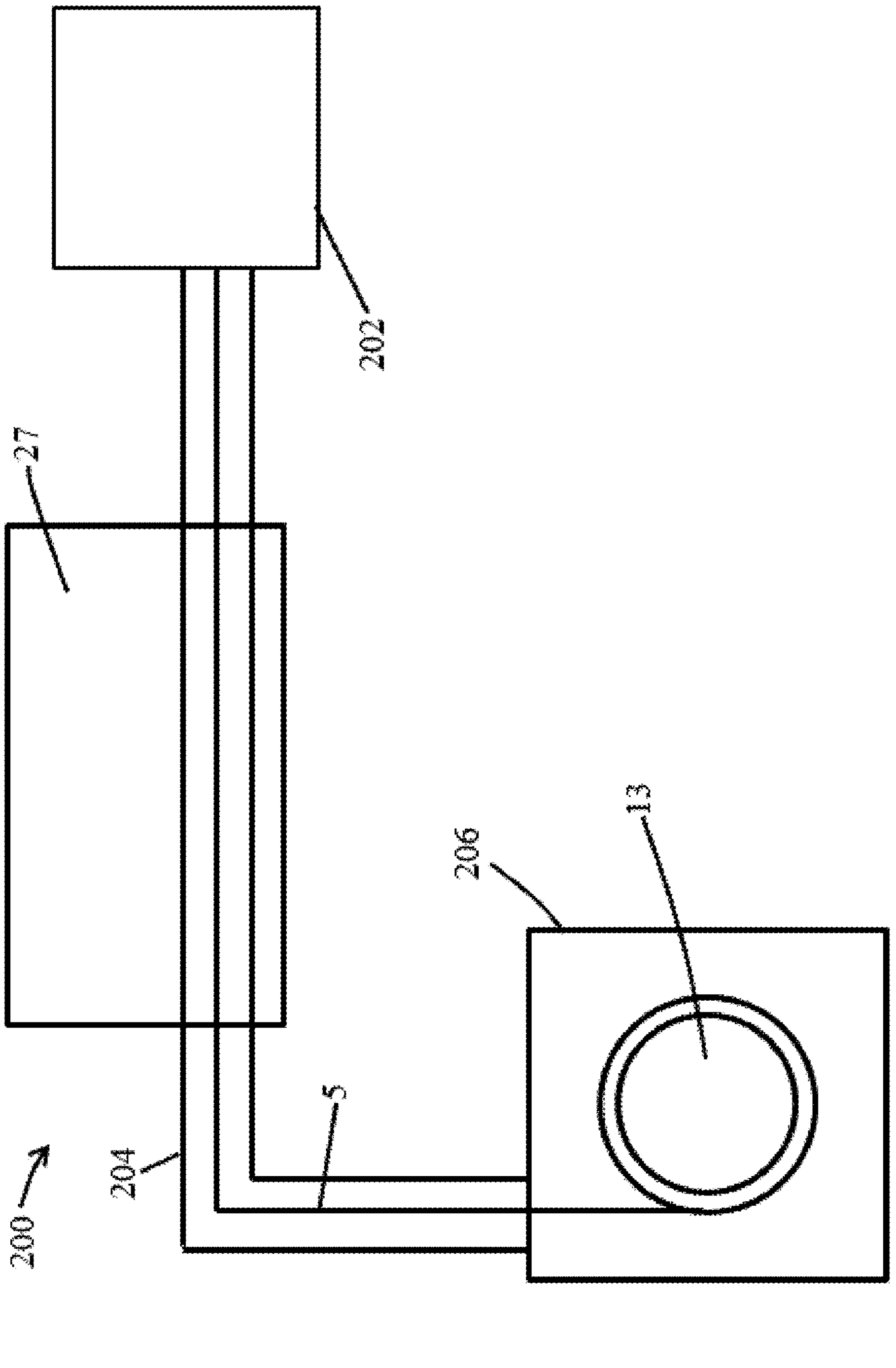
FIG. 6 schematically illustrates a production line for filament, incorporating a filament drying system according to an embodiment of the invention.

FIG. 6 schematically illustrates an example of using the filament drying system 27 in a production line 200. It will be appreciated that the details of the production line 200 are given by way of example only.

The production line 200 includes a filament manufacturing system 202. This may be any known filament production system. The production line 200 also includes a packing stage 206 in which the filament 5 is packaged for storage. For example, the filament 5 may be wound on a reel or spool 13. The filament 5 may also be enclosed in a sealed container (not shown). It will be appreciated that the use of a reel or spool 13 and a sealed container is by way of example only, and the filament 5 may be packaged in any suitable manner.

A guide 204 made of low friction material connects the production stage 202 to the packaging stage 206 and conveys the filament 5 in the production line 200. The filament 5 is fed through the guide tube 204, winding filament onto the spool 13 using any suitable method.

In the example shown, the guide tube 204 is an enclosed space through which the filament 5 passes, and the guide tube 204, production stage 202 and packaging stage 206 may be held in a sealed or controlled environment, but this need not necessarily be the case. Any suitable low friction material, such as Polytetrafluoroethylene (PTFE) may be used for the guide tube 204. Other suitable materials, such as silicone rubber/silicone may also be used for the guide tube 204 in other examples.

The guide tube 204 incorporates a system 27 for drying the filament 5. Unless explicitly stated otherwise, the drying system 27 is as discussed above in relation to FIGS. 1 to 5, and is connected into the production line 200 in a similar manner to how the drying system is connected into the 3D printer 1 or AM machine. The drying system 27 conditions the filament to ensure the moisture content is within the desired range prior to sealing the filament in an enclosed environment.

The invention claimed is:

1. A system arranged to dry a filament used in additive manufacture, the system comprising:

a first heater arranged to heat air;

a tubing section having a wall defining an enclosed passage, the passage arranged to convey a filament, the tubing section having an air inlet for providing heated air from the first heater into the passage; and a second heater arranged along at least part of the tubing section, in order to further heat filament within the passage;

wherein the tubing section comprises: a filament inlet for receiving the filament to be dried; and a filament outlet for providing dried filament, wherein the filament inlet and the filament outlet are sealable around the filament such that the passage forms a sealed space, wherein the filament inlet and/or the filament outlet comprise: an opening into the passage; and a resiliently deformable sealing member closing the opening, the sealing member having an aperture to receive the filament, the edge of the aperture arranged to engage the filament to form a seal.

2. The system of claim 1, wherein the tubing section further has an air outlet for drawing air from the passage, the system further comprising a recycling system for providing air withdrawn at the air outlet to the first heater in a closed loop, wherein the recycling system includes an air dryer for extracting water from the air withdrawn at the air outlet before providing it to the first heater.

3. The system of claim 2, wherein the recycling system comprises a desiccant arranged to extract water from the air as it passed from the air outlet to the first heater.

4. The system of claim 3, wherein the system is arranged to monitor the saturation of the desiccant and comprises:

a first humidity sensor arranged between the air outlet and the desiccant;

a second humidity sensor arranged between the desiccant and the first heater; and a recycling control module arranged to:

monitor a first humidity measured by the first humidity sensor, and a second humidity measured by the second humidity sensor; and provide a warning when a difference between the first humidity and the second humidity is below a threshold, indicating saturation of the desiccant.

5. The system of claim 3, wherein the desiccant is provided in a replaceable cartridge.

6. The system of claim 3, comprising an air cooler arranged to cool air drawn from the passage, prior to providing the air to the desiccant.

7. The system of claim 6, wherein the system comprises a conduit for carrying air from the air outlet to the desiccant, and wherein the air cooler comprises an uninsulated portion of the conduit extending at least part of the length of the conduit.

8. The system of claim 2, wherein the closed loop from the air outlet to the air inlet, including the recycling system and first heater, is formed in a sealed environment.

9. The system of claim 1, wherein the sealing member has a thinned region around the edge of the aperture.

10. The system of claim 1, wherein the system is for use with filament having a diameter greater than a first size, and wherein the aperture has a diameter, the diameter of the aperture being less than the first size.

11. A system arranged to dry a filament used in additive manufacture, the system comprising:

a first heater arranged to heat air;

a tubing section having a wall defining an enclosed passage, the passage arranged to convey a filament, the tubing section having an air inlet for providing heated air from the first heater into the passage;

a second heater arranged along at least part of the tubing section, in order to further heat filament within the passage;

a drying control module arranged to control the first heater and second heater to control the amount of water removed from the filament;

a first temperature sensor arranged to measure an air temperature at an output of the first heater; and a second temperature sensor arranged to measure an air temperature within the passage;

wherein the drying control module controls the first heater and the second heater based on the air temperatures measured by the first and second temperature sensors, to control the amount of water removed from the filament.

12. The system of claim 11, comprising:

humidity sensors arranged to measure humidity of air in the passage, wherein the drying control module controls the first heater and the second heater based on the humidity measured in the passage, to control the amount of water removed from the filament.

13. The system of claim 11, wherein the drying control module is further arranged to control the speed filament is conveyed through the passage and/or the flow rate of air through the passage, to control the amount of water removed from the filament.

14. The system of claim 1, wherein the second heater has a plurality of different heating zones arranged along the length of the passage; and wherein the second heater is arranged such that the different heating zones are independently controllable.

15. The system of claim 1, wherein the system is provided as a modular device to retrofit to existing 3D printers.

16. The system of claim 1, wherein the passage is arranged to convey the filament within a filament production line.

17. The system of claim 11, wherein the tubing section further has an air outlet for drawing air from the passage, the system further comprising a recycling system for providing air withdrawn at the air outlet to the first heater in a closed loop, wherein the recycling system includes an air dryer for extracting water from the air withdrawn at the air outlet before providing it to the first heater.

18. An additive manufacturing machine comprising:

a filament store;

a deposition head including a liquefier for liquefying filament;

a filament guide for feeding filament from the filament store to the liquefier; and a system for drying the filament, the system comprising:

a first heater arranged to heat air;

a tubing section having a wall defining an enclosed passage, the passage arranged to convey filament from the filament store, the tubing section having an air inlet for providing heated air from the first heater into the passage and forming at least part of the filament guide; and a second heater arranged along at least part of the tubing section, in order to further heat the filament within the passage;

wherein the tubing section comprises: a filament inlet for receiving the filament to be dried; and a filament outlet for providing dried filament, wherein the filament inlet and filament outlet are sealable around the filament such that the passage forms a sealed space, wherein the filament inlet and/or the filament outlet comprise: an opening into the passage; and a resiliently deformable sealing member closing the opening, the sealing member having an aperture to receive the filament, the edge of the aperture arranged to engage the filament to form a seal.

19. The additive manufacturing machine of claim 18, wherein the tubing section of the system for drying the filament is immediately upstream of the liquefier.

20. The additive manufacturing machine of claim 18, wherein the filament store is a first filament store, the filament guide is a first filament guide for feeding filament from the first filament store to the liquefier, and the system for drying the filament is a first system for drying the filament fed from the first filament store, the additive manufacturing machine further comprising:

a second filament store;

a second filament guide for feeding filament from the second filament store to the liquefier; and a second system for drying the filament fed from the second filament store, the second system for drying filament comprising:

a third heater arranged to heat air;

a second tubing section having a wall defining a second enclosed passage, the second passage arranged to convey filament from the second filament store, the second tubing section having an air inlet for providing heated air from the third heater into the second passage and forming at least part of the second filament guide; and a fourth heater arranged along at least part of the second tubing section, in order to further heat the filament from the second filament store within the second passage.

21. An additive manufacturing machine comprising:

a filament store;

a deposition head including a liquefier for liquefying filament;

a filament guide for feeding filament from the filament store to the liquefier; and a system for drying the filament, the system comprising:

a first heater arranged to heat air;

a tubing section having a wall defining an enclosed passage, the passage arranged to convey a filament, the tubing section having an air inlet for providing heated air from the first heater into the passage and forming at least part of the filament guide; and a second heater arranged along at least part of the tubing section, in order to further heat filament within the passage, wherein the system further comprises a drying control module arranged to control the first heater and second heater to control the amount of water removed from the filament; a first temperature sensor arranged to measure an air temperature at an output of the first heater; and a second temperature sensor arrange to measure an air temperature within the passage, wherein the drying control module controls the first heater and the second heater based on the air temperatures measured by the first and second temperature sensors, to control the amount of water removed from the filament.

22. The additive manufacturing machine of claim 21, wherein the tubing section of the system for drying the filament is immediately upstream of the liquefier.

* * * * *